(12) United States Patent
Motwani et al.

(10) Patent No.: US 12,443,433 B2
(45) Date of Patent: Oct. 14, 2025

(54) SYSTEMS AND METHODS FOR RESOLVING INTERDEPENDENCIES BETWEEN USER INTERFACES IN A DOMAIN DRIVEN DESIGN MICROSERVICE ARCHITECTURE

(71) Applicant: JPMORGAN CHASE BANK, N.A., New York, NY (US)

(72) Inventors: Hemant Motwani, Cypress, TX (US); Bret Goldsmith, Sugarland, TX (US); Andrew Irving, Houston, TX (US); Robert Stone, New York, NY (US); Daniel Gomero, Houston, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 455 days.

(21) Appl. No.: 17/644,731

(22) Filed: Dec. 16, 2021

(65) Prior Publication Data

US 2023/0195504 A1 Jun. 22, 2023

(51) Int. Cl.
*G06F 9/46* (2006.01)
*G06F 9/451* (2018.01)
(Continued)

(52) U.S. Cl.
CPC ............ *G06F 9/466* (2013.01); *G06F 9/451* (2018.02); *G06F 9/48* (2013.01); *G06F 9/52* (2013.01); *G06F 9/54* (2013.01); *G06F 9/542* (2013.01)

(58) Field of Classification Search
CPC . G06F 9/451; G06F 9/466; G06F 9/52; G06F 9/542; G06F 9/546
See application file for complete search history.

(56) References Cited

U.S. PATENT DOCUMENTS 12,124,435 B1 * 10/2024 Alves .................. G06F 16/2379
2007/0077922 A1 * 4/2007 Kim ........................ H04H 20/57
455/414.2

(Continued)

OTHER PUBLICATIONS

Kul et al, "Event-Based Microservices With Apache Kafka Streams: A Real-Time Vehicle Detection System Based on Type, Color, and Speed Attributes", IEEE, Jun. 15, 2021, pp. 83137-83148 (Year: 2021).*

(Continued)

*Primary Examiner* — Charles M Swift
(74) *Attorney, Agent, or Firm* — GREENBERG TRAURIG LLP

(57) ABSTRACT

A method may include a monitoring computer program: receiving a first message with a first unique identifier and first user data from a first service as part of a multi-step transaction; recording the first message and the first unique identifier and associating the first message with the first unique identifier; receiving, from a second service, a completion message for consumption of the first user data and the first unique identifier; recording the completion message and the first unique identifier; recording a status for the first message; receiving a status query for the first message with the first unique identifier from the first service; returning the status to the first service; receiving a second message comprising a second unique identifier and second user data from the second service; and recording the second message and the second unique identifier and associating the second message with the second unique identifier.

13 Claims, 2 Drawing Sheets

(51) Int. Cl.
  *G06F 9/48*    (2006.01)
  *G06F 9/52*    (2006.01)
  *G06F 9/54*    (2006.01)

(56)              References Cited

U.S. PATENT DOCUMENTS

2012/0157042 A1*  6/2012  McCanna ............. H04M 15/83
                                                   455/407
2012/0278168 A1* 11/2012  O'Hara ............. G06Q 30/0271
                                                   705/14.53
2016/0360004 A1* 12/2016  Lue-Sang ................ G06F 9/54
2019/0044836 A1*  2/2019  Kavanagh ........... G06F 11/3006
2019/0065246 A1*  2/2019  Senapaty ............. G06F 9/5088
2019/0235974 A1*  8/2019  Pardon ............... G06F 11/2094
2020/0042365 A1   2/2020  Tanna et al.
2020/0125572 A1*  4/2020  Hanckel ................ G06F 16/248
2021/0350458 A1* 11/2021  Gaur ..................... G06Q 40/02
2021/0385176 A1  12/2021  Edamadaka et al.
2023/0009811 A1*  1/2023  Bakos ................... H04L 67/562

OTHER PUBLICATIONS

International Search Report and Written Opinion of the International Searching Authority, dated Aug. 25, 2022, from corresponding International Application No. PCT/US2021/072979.

* cited by examiner

SYSTEMS AND METHODS FOR RESOLVING INTERDEPENDENCIES BETWEEN USER INTERFACES IN A DOMAIN DRIVEN DESIGN MICROSERVICE ARCHITECTURE

BACKGROUND OF THE INVENTION

1. Field of the Invention

Embodiments relate generally to systems and methods for resolving interdependencies between user interfaces in a domain driven design microservice architecture.

2. Description of the Related Art

Computer processes may involve a plurality of services. Each service, however, may operate independently of each other, and it is difficult to know if first service has consumed a message that it is required to consume before a second service can be executed.

SUMMARY OF THE INVENTION

Systems and methods for resolving interdependencies between user interfaces in a domain driven design microservice architecture are disclosed. According to one embodiment, a method for may include: (1) receiving, by a monitoring computer program executed by an electronic device, a first message with a first unique identifier and first user data from a first service, the first user data received as part of a multi-step transaction involving the first service and a second service; (2) recording, by the monitoring computer program, the first message and the first unique identifier and associating the first message with the first unique identifier; (3) receiving, by the monitoring computer program and from the second service, a completion message for consumption of the first user data with the first unique identifier; (4) recording, by the monitoring computer program, the completion message and the first unique identifier; (5) recording, by the monitoring computer program, a status for the first message; (6) receiving, by the monitoring computer program, a status query for the first message with the first unique identifier from the first service; (7) returning, by the monitoring computer program, the status for the first message to the first service; (8) receiving, by the monitoring computer program, a second message comprising a second unique identifier and second user data from the second service; and (9) recording, by the monitoring computer program, the second message and the second unique identifier and associating the second message with the second unique identifier.

In one embodiment, the first user data and the second user data may be received at a user interface of a user electronic device.

In one embodiment, the first service redirects the user interface to the second service in response to the completion message.

In one embodiment, the first unique identifier may be generated by the first service, and the second unique identifier may be generated by the second service.

In one embodiment, the first message may be published by a first event hub for the first service.

In one embodiment, the completion message and the second message may be published by a second event hub for the second service.

In one embodiment, the status provided by the monitoring computer program may include a 200 response code.

In one embodiment, the monitoring computer program returns an error to the first service in response to passage of a predetermined amount of time without receiving the completion message.

According to another embodiment, a system may include: an electronic device executing a user interface; a computer application executing a multi-step transaction comprising a first service and a second service; and a monitoring computer program in communication the user interface and the first service and the second service via a messaging bus. The first service may present a first screen on the user interface and receives first user data from the first screen and may publish a first message with a first unique identifier and the first user data on the messaging bus. The monitoring computer program may record the first message and the first unique identifier and associate the first message with the first unique identifier. The second service may access the first user data and may post a completion message for the first user data with the first unique identifier on the messaging bus. The monitoring computer program may record the completion message and the first unique identifier and a status for the first message, may receive a status query for the first message with the first unique identifier from the first service, and may return the status for the first message to the first service. The first service may redirect the user interface to a second screen for the second service. The monitoring computer program may receive a second message comprising a second unique identifier and second user data from the second service and may record the second message and the second unique identifier and associate the second message with the second unique identifier.

In one embodiment, the system may also include a first event hub for the first service and a second event hub for the second service, wherein the first message may be published by the first event hub, and the completion message and the second message may be published by the second event hub.

In one embodiment, the status provided by the monitoring computer program may include a 200 response code.

In one embodiment, the monitoring computer program may return an error to the first service in response to passage of a predetermined amount of time without receiving the completion message.

According to another embodiment, an electronic device may include a memory comprising a monitoring computer program and a computer processor. When executed by the computer processor, the monitoring computer program may cause the computer processor to: receive a first message with a first unique identifier and first user data from a first service, the first user data received as part of a multi-step transaction involving the first service and a second service; record the first message and the first unique identifier and associate the first message with the first unique identifier; receive a completion message for consumption of the first user data with the first unique identifier; record the completion message and the first unique identifier; record a status for the first message; receive a status query for the first message with the first unique identifier from the first service; return the status for the first message to the first service; receive a second message comprising a second unique identifier and second user data from the second service; and record the second message and the second unique identifier and associate the second message with the second unique identifier.

In one embodiment, the first user data and the second user data may be received at a user interface of a user electronic device.

In one embodiment, the first service may redirect a user interface to the second service in response to the completion message.

In one embodiment, the first unique identifier may be generated by the first service, and the second unique identifier may be generated by the second service.

In one embodiment, the first message may be published by a first event hub for the first service, and the completion message and the second message may be published by a second event hub for the second service.

In one embodiment, the status provided by the monitoring computer program may include a 200 response code.

In one embodiment, the monitoring computer program may also cause the computer processor to return an error to the first service in response to passage of a predetermined amount of time without receiving the completion message.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for resolving interdependencies between user interfaces in a domain driven design microservice architecture.

Embodiments may include the following components. First, API return published message metadata—for APIs that generate events that can be tracked as part of their response, the APIs may include metadata about the messages they produced. This metadata may include at least some of a topic, an offset, a partition, a key, and a transaction ID. The APIs may further return a 202 Accepted or similar that indicates that the request has been received, but that processing is still ongoing.

Next, an event hub may publish consumption messages. A conventional event hub handles the details of finding messages ready for consumption, consuming them, dispatching to a consumer's handler, and acknowledging that the event has been consumed. In embodiments, the event hub may also send a consumption message that indicates the specific message (by way of topic, partition, and offset) and the specific consumer (by way of sender of the consumption message), in addition to acknowledging events. This does not require any changes to existing code. The event hub may send a consumption confirm event in response to a consumer successfully consuming, processing, and committing an event, or a consumption error event when a consumer successfully consumes but errors during processing of an event.

Third, a service creation may be provided. This service has a consumer that processes the consumption messages and persists the results to a database, such as an Oracle Database. An API may allow callers to determine if a specific message has been processed by a specific consumer.

Figure 1:
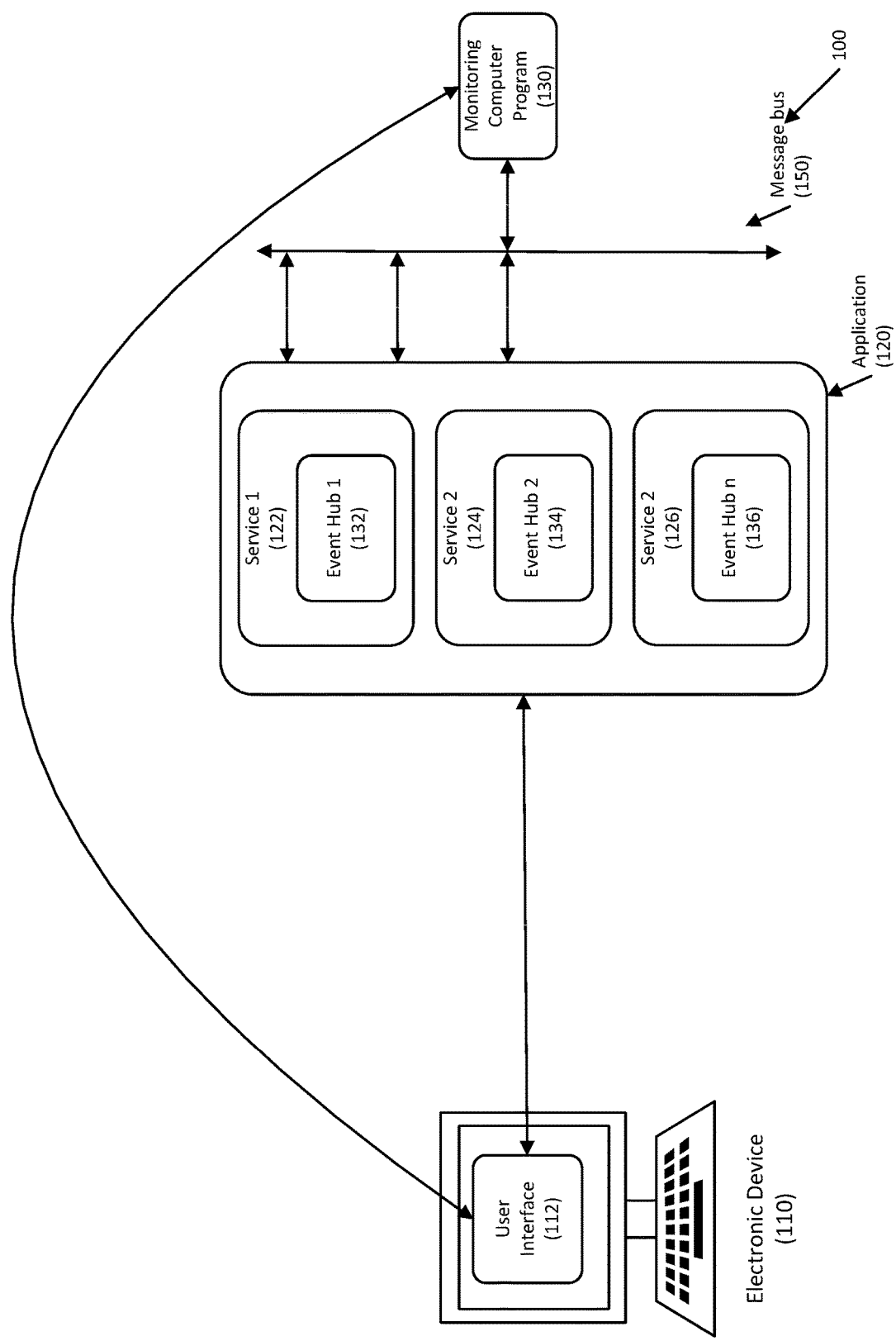
FIG. 1 is a depicts a system for resolving interdependencies between user interfaces in a domain driven design microservice architecture according to an embodiment.

Referring to FIG. 1, a system for resolving interdependencies between user interfaces in a domain driven design microservice architecture is disclosed according to an embodiment. System may include electronic device 110, which may be any suitable electronic device, such as workstations, computers (e.g., desktop, laptop, notebook, tablet, etc.), smart devices (e.g., smartphones), Internet of Things (IoT) devices, etc. Electronic device 110 may present user interface 112, which may be a computer program, a browser, an application, etc. that may interface with application 120, which may be a distributed application having a plurality of services, such as service 1 122, service 2 124, service n 126. In one embodiment, application 120 may be hosted by a physical server, by the cloud, by a combination thereof, etc.

In one embodiment, services 122, 124, 126 may include event hubs 132, 134, 136, respectively. Event hubs 132, 134, 136 may be a subcomponent of each services 122, 124, 126, respectively. Event hubs 132, 134, 136 may each be a library of events.

Service 1 122, service 2 124, service n 126, etc. may communicate over message bus 150, which may be a Kafka message. For example, service 1 122, service 2 124, service n 126, etc. may receive requests from user interface 112 via message bus 150, may post acknowledgements of the receipt of the message to message bus 150, and may post consumption messages to message bus 150.

In one embodiment, requests from user interface 112, as well as the acknowledgement message and the consumption message may include a unique identifier.

Monitoring computer program 130 may monitor message bus for requests from user interface 112 and acknowledgement messages and consumption messages from service 1 122, service 2 124, service n 126, etc.

Figure 2:
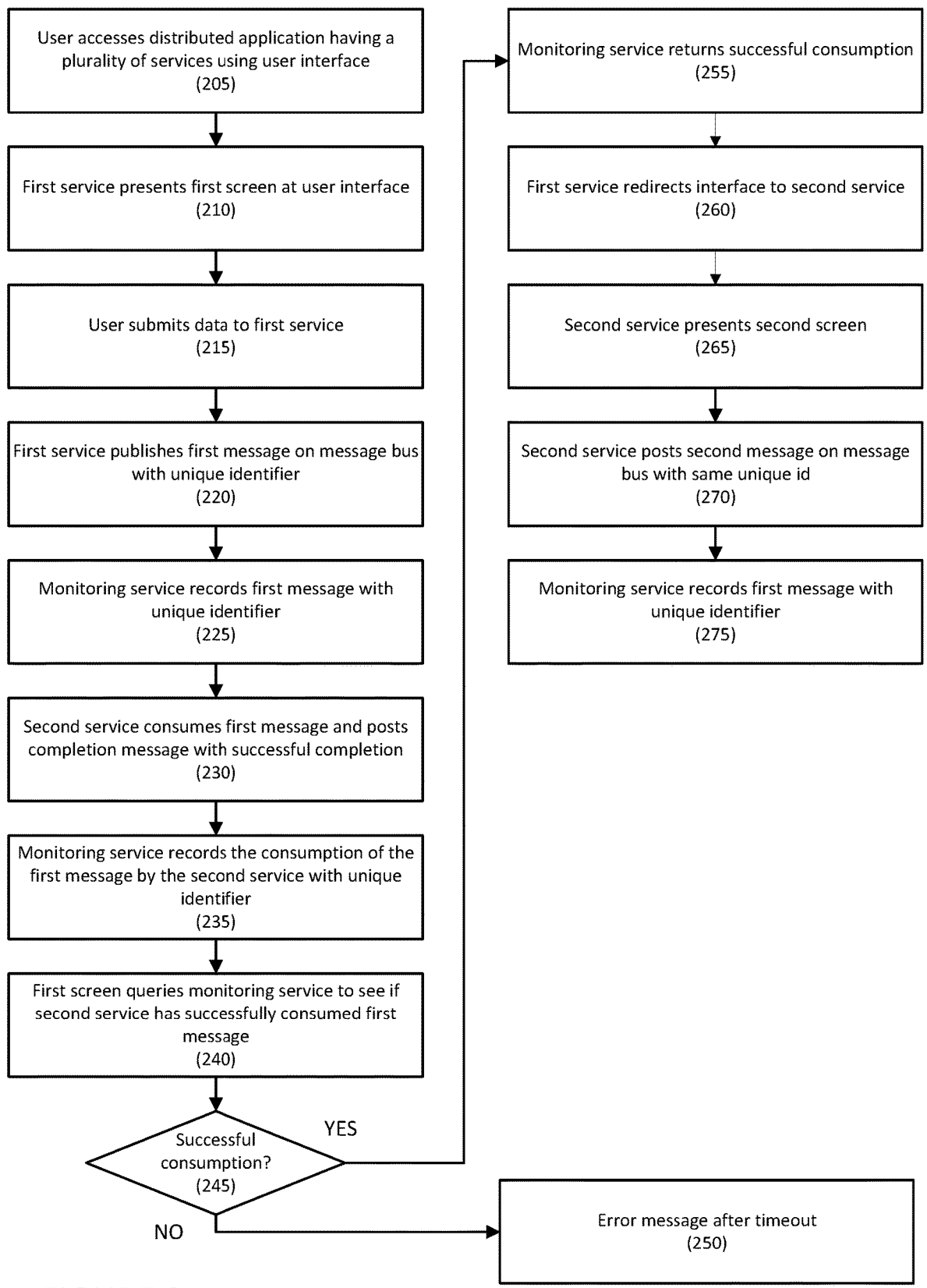
FIG. 2 depicts a method for resolving interdependencies between user interfaces in a domain driven design microservice architecture according to an embodiment.

Referring to FIG. 2, a method for resolving interdependencies between user interfaces in a domain driven design microservice architecture is disclosed according to an embodiment.

In step 205, a user may access a distributed application having a plurality of services using user interface. The user interface may be a browser, an application, a computer program, etc.

In step 210, a first service may present a first screen at the user interface.

In step 215, the user may submit data to the first service via the first screen. Any sort of information may be entered. For example, the user may enter information that may be consumed by a second service. In one embodiment, data entered on the first screen by the user may be part of the multi-step transaction that the user is working on.

In step 220, the first service may publish a first message on the message bus with a first unique identifier. In one embodiment, the first unique identifier may be systematically generated by the first service. An event hub for the first service may publish the first message for the first service.

In one embodiment, the first message may include at least some of the data entered into the first service.

In step 225, a monitoring service computer program may record the first message and the first unique identifier. For example, the monitoring service computer program may store an association of the first message and the first unique identifier. The monitoring service computer program may also store a status of the first message (e.g., published).

In step 230, the second service may acknowledge and consume the first message, and may post a completion message for first message with the first unique identifier on the messaging bus. The message may indicate successful consumption, failed consumption, etc. An event hub for the second service may publish the completion message for the second service.

In step 235, the monitoring service computer program may monitor the messaging bus for completion messages and may record the consumption of the first message by the second service. The monitoring service computer program may update the status of the first message to, for example, consumed or similar.

In step 240, the first service may query the monitoring service computer program to see if the second service has successfully consumed the first message. For example, using the first unique identifier, the first service may make a synchronous call to the monitoring service computer program to check to see if the second service has successfully consumed the first message.

The browser may wait to load to the next screen as it depends on the monitoring service computer program responding with a response code (e.g., a 200 response code).

The monitoring service computer program may respond to the first service with a response code, either with the unique identifier when the second service has successfully consumed the first message, or with an indication that the second service has not successfully consumed the message.

The monitoring service computer program may further limit the amount of time before the error message is presented. For example, if the completion message is not received within 5 seconds, the monitoring service computer program may return the error message. The timings used by the monitoring service computer program are configurable and may be set as is necessary and/or desired.

If, in step 245, the second service posted a message that the message has not been successfully consumed, or has not posted a consumption message, in step 250, the monitoring service computer program may return an error message.

In one embodiment, the monitoring service computer program may wait a period of time for the second service to post a completion message before returning the error message.

If the message was successfully consumed, in step 255, the monitoring service computer program may return a successful completion message to the first service.

In step 260, the first service may redirect the interface to the second service, and in step 265, the second service may present a second screen on the interface. The user may then enter data into the second screen to capture additional data as part of the multi-step transaction.

In step 270, the second service may post a second message on the message bus with a second unique identifier. The event hub for the second service may publish the second message for the second service.

In step 275, the monitoring service computer program may record the second message with the second unique identifier and may update the status of the second message to, for example, posted.

In embodiments, the process may continue, including with additional services, until the multi-step transaction is complete. This may include additional services as is necessary and/or desired.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention.

Accordingly, the foregoing disclosure is not intended to be construed or to limit the present invention or otherwise to exclude any other such embodiments, adaptations, variations, modifications or equivalent arrangements.

What is claimed is:

1. A method for resolving interdependencies between user interfaces in a domain driven design microservice architecture, comprising:
receiving, by a monitoring computer program executed by an electronic device and from an application including a plurality of services and through a message bus, a first message with a first unique identifier generated by the first service and first user data from a first service of the plurality of services, the first user data received as part of a multi-step transaction involving the first service and a second service;
recording, by the monitoring computer program, the first message and the first unique identifier and associating the first message with the first unique identifier;
receiving, by the monitoring computer program and from the second service of the plurality of services and through the message bus, a completion message for consumption of the first user data with the first unique identifier, wherein the completion message indicates a content of the message and identifies a consumer, wherein the first user data is received at a user interface of a user electronic device, wherein the content comprises a topic, a partition, and an offset;
recording, by the monitoring computer program, the completion message and the first unique identifier;
redirecting the user interface to the second service in response to the completion message;
recording, by the monitoring computer program, a status for the first message;
receiving, by the monitoring computer program and through the message bus, a status query for the first message with the first unique identifier from the first service;
returning, by the monitoring computer program, the status for the first message to the first service through the message bus;
receiving, by the monitoring computer program, a second message comprising a second unique identifier and second user data, each generated by the second service, wherein the second user data is received at the user interface of the user electronic device based on the redirection; and
recording, by the monitoring computer program, the second message and the second unique identifier and associating the second message with the second unique identifier.

2. The method of claim 1, wherein the first message is published by a first event hub for the first service and is a Kafka message, wherein the first event hub is a first library of events.

3. The method of claim 1, wherein the completion message and the second message are published by a second event hub for the second service, wherein the second event hub is a second library of events.

4. The method of claim 1, wherein the status provided by the monitoring computer program comprises a 200 response code.

5. The method of claim 1, wherein the monitoring computer program returns an error to the first service in response to passage of five seconds without receiving the completion message.

6. A system, comprising:
an electronic device executing a browser;
a computer application executing a multi-step transaction comprising a first service and a second service; and
a monitoring computer program in communication with the browser and the first service and the second service via a messaging bus;
wherein:
the first service presents a first screen on the browser and receives first user data from the first screen;
the first service publishes a first message with a first unique identifier generated by the first service and the first user data on the messaging bus;
the monitoring computer program records the first message and the first unique identifier and associates the first message with the first unique identifier;
the second service accesses the first user data and posts a completion message for the first user data with the first unique identifier on the messaging bus, wherein the completion message indicates a content of the message and identifies a consumer, wherein the content comprises a topic, a partition, and an offset;
the monitoring computer program records the completion message and the first unique identifier and a status for the first message;
the monitoring computer program receives a status query for the first message with the first unique identifier from the first service;
the monitoring computer program returns the status for the first message to the first service;
the first service redirects the browser to a second screen for the second service in response to the status and after waiting to load the second screen until a response code based on the response is received;
the monitoring computer program receives a second message comprising a second unique identifier generated by the second service and second user data from the second service; and
the monitoring computer program records the second message and the second unique identifier and associates the second message with the second unique identifier.

7. The system of claim 6, further comprising a first event hub for the first service and a second event hub for the second service, wherein the first message is published by the first event hub and is a Kafka message, and the completion message and the second message are published by the second event hub, wherein the first event hub and the second event hub are each a library of events.

8. The system of claim 6, wherein the response code provided by the monitoring computer program comprises a 200 response code.

9. The system of claim 6, wherein the monitoring computer program returns an error to the first service in response to passage of five seconds without receiving the completion message.

10. An electronic device, comprising:
a memory comprising a monitoring computer program; and
a computer processor;
wherein, when executed by the computer processor, the monitoring computer program causes the computer processor to:
receive a first message with a first unique identifier generated by the first service and first user data from a first service, the first user data received as part of a multi-step transaction involving the first service and a second service, wherein the first user data is received at a browser of a user electronic device;

record the first message and the first unique identifier and associate the first message with the first unique identifier;

receive a completion message for consumption of the first user data with the first unique identifier, wherein the completion message indicates a content of the message and identifies a consumer, wherein the content comprises a topic, a partition, and an offset;

record the completion message and the first unique identifier;

record a status for the first message;

receive a status query for the first message with the first unique identifier from the first service;

return the status for the first message to the first service;

redirect the browser to the second service in response to the completion message and after waiting to load the second screen until a response code based on the response is received;

receive a second message comprising a second unique identifier generated by the second service and second user data from the second service, wherein the second user data is received at the browser of the user electronic device based on the redirection; and record the second message and the second unique identifier and associate the second message with the second unique identifier.

11. The electronic device of claim 10, wherein the first message is published by a first event hub for the first service and is a Kafka message, and the completion message and the second message are published by a second event hub for the second service, wherein the first event hub and the second event hub are each a library of events.

12. The electronic device of claim 10, wherein the response code provided by the monitoring computer program comprises a 200 response code.

13. The electronic device of claim 10, wherein the monitoring computer program causes the computer processor to return an error to the first service in response to passage of five seconds without receiving the completion message.

* * * * *